United States Patent
Jintaseranee et al.

(10) Patent No.: US 8,060,086 B1
(45) Date of Patent: Nov. 15, 2011

(54) METHOD AND APPARATUS FOR PROCESSING MOBILE-IP REGISTRATION REQUESTS

(75) Inventors: Kosol Jintaseranee, Sunnyvale, CA (US); Qiu Jin, Cupertino, CA (US); Travis E. Dawson, San Francisco, CA (US); Jing Jong Yea, Hillsborough, CA (US); John N. Larson, Pacifica, CA (US); Linda Chau, Fremont, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1017 days.

(21) Appl. No.: 11/934,408

(22) Filed: Nov. 2, 2007

(51) Int. Cl.
*H04W 4/00* (2009.01)
(52) U.S. Cl. .................... 455/433; 455/436; 370/331
(58) Field of Classification Search .................. 455/433, 455/436; 370/331
See application file for complete search history.

(56) References Cited

U.S. PATENT DOCUMENTS

| | | | |
|---|---|---|---|
| 2006/0140196 A1* | 6/2006 | Tanaka et al. | 370/401 |
| 2007/0121553 A1* | 5/2007 | Yoon et al. | 370/335 |
| 2007/0297370 A1* | 12/2007 | Shimizu et al. | 370/331 |
| 2008/0279151 A1* | 11/2008 | Patil et al. | 370/331 |
| 2009/0147789 A1* | 6/2009 | Ng et al. | 370/392 |
| 2009/0274102 A1* | 11/2009 | O'Neill | 370/328 |

* cited by examiner

*Primary Examiner* — Barry W Taylor (57) ABSTRACT

A method and apparatus for processing mobile-IP registration messages. Upon receipt of a mobile-IP registration request (RRQ) message that designates a care-of address matching the mobile-IP home agent's IP address, the RRQ would be dropped. Alternatively, before deciding to drop such an RRQ, the invention may further involve determining whether the home agent is currently functioning as a foreign agent for the requesting mobile node, which would justify the care-of address matching the home agent's IP address. If the home agent is not currently functioning as a foreign agent for the mobile node, then the RRQ would be dropped. On the other hand, if the home agent is currently functioning as a foreign agent for the mobile node, then RRQ processing would proceed as normal.

3 Claims, 5 Drawing Sheets

METHOD AND APPARATUS FOR PROCESSING MOBILE-IP REGISTRATION REQUESTS

BACKGROUND

The typical arrangement and operation of computer networks employing mobile-IP communications is well known. As a general matter a mobile node obtains a mobile-IP address ("home address" or "HoA") from a mobile IP home agent and registers with the home agent to let the home agent know the network where the mobile node is currently operating. When IP communications are sent to the mobile node's home address, the communications are conventionally routed to the home agent. And based on the mobile node's registration, the home agent then routes the communications to the mobile node's current serving network. Upon receipt of those communications, the mobile node's serving network then forwards the communications locally to the mobile node.

More specifically, each serving network in a mobile-IP system may include a mobile IP foreign agent (e.g., router, network access server, or the like) having an IP address referred to as a care-of address or "CoA", and the foreign agent broadcasts its care-of address in a "router advertisement message" ("ICMP Type 9" message) for receipt by mobile nodes operating on the foreign agent's network. When a mobile node receives a router advertisement message that carries a new care-of address (one with which the mobile node is not currently associated), the mobile node then assumes that it is operating on a new serving network. Accordingly, in response, the mobile node sends a mobile-IP registration request (RRQ) message to the mobile node's home agent (via the foreign agent), to register the new care-of address in connection with the mobile node's home address. In turn, the home agent then returns a mobile-IP registration reply (RRP) message to the mobile node (via the foreign agent), designating the home address to be used by the mobile station.

Through this process, a communication tunnel is effectively set up between the mobile node's home agent and the mobile node's foreign agent, since the home agent is set to forward to the foreign agent all communications that are destined to the mobile node's home address, for local transmission in turn from the foreign agent to the mobile node. Thus, in practice, the mobile node may include its home address as the source address in any outbound packet communications that it sends. Packet communications that are then sent in response to the mobile station's home address would then be routed to the home agent, since the home address is associated with the home agent. In turn, the home agent would then pass those communications to the mobile node's care-of address at the foreign agent, and the foreign agent would then pass the communications locally to the mobile station.

In general, when a home agent receives a mobile-IP RRQ that designates a new care-of address for a mobile node, the home agent will tear down the tunnel that the home agent has with the mobile node's old care-of address, i.e., with the mobile node's old foreign agent. In particular, the home agent will update its registration record for the mobile node to correlate the mobile node's home address with the new foreign agent's care-of address. That way, when the home agent subsequently receives communications destined to the mobile node's home address, the home agent will forward them to the new foreign agent rather than the old foreign agent, for transmission in turn to the mobile node.

In many networks, the foreign agent may further serve to track communications by mobile nodes, for billing and other purposes. In particular, communications from the mobile node may pass through the foreign agent on their way to their destination, and, due to the very nature of mobile-IP, communications destined to the mobile node's mobile-IP address will also pass through the foreign agent on their way to the mobile node. In practice, as these communications pass through the foreign agent, the foreign agent may log the communications, such as by reporting communication start and stop times and/or data quantities to an authentication, authorization, and accounting (AAA) server that works with a billing system. Accordingly, the mobile node user can be billed for sending and receiving packet communications.

In some mobile-IP implementations, each serving network will have a mobile-IP foreign agent, and a centralized home agent will be provided separately from the foreign agents (e.g., on a central network connected with the serving networks, or on one of the serving networks). This implementation is commonplace in cellular wireless networks for instance, where each serving network has a packet data serving node (PDSN) that serves as a mobile-IP foreign agent for mobile nodes operating in the serving network, and at least one centralized home agent is provided separate from the PDSNs, typically on a wireless carrier's core packet network. In such an arrangement, a mobile node is always located on a "foreign network," even if the mobile node is located on its home network as well, since the PDSN currently serving the mobile node operates as a foreign agent for the mobile node.

In other mobile-IP implementations, a mobile node may have a home serving network, and the home network may include a server that functions as both a home agent and foreign agent for the mobile node, and as a foreign agent for visiting nodes. In such an implementation, the home network server may assign a mobile-IP address to the mobile node, just as a home agent would normally do. However, no tunnel would need to be set up for the mobile node when the mobile node is operating in its home serving network, since the home agent is the foreign agent.

In such an implementation, when the mobile node roams to another serving network and detects a router advertisement message that designates the care-of address of the foreign agent on the new serving network, the mobile node may then register with the home agent in the mobile node's home network, to register the new care-of address in connection with the mobile node's mobile-IP address. That way, communications destined for the mobile node's mobile-IP address will be routed to the mobile node's home agent in its home network. Conventionally, the home agent will then forward the communications to the mobile node's registered care-of address, which will be the address of the foreign agent in the new serving network, and the foreign agent will pass those communications locally to the mobile node.

In turn, if the mobile roams back into its home network, the mobile node would similarly receive a router advertisement message from the foreign agent on its home network. However, in this case, the router advertisement message would carry as a care-of address an IP address that is the same as the IP address of the mobile node's home agent, since the foreign agent is the home agent. Conventionally, the mobile node will then again transmit a mobile-IP RRQ message to its home agent, providing the care-of address received in the router advertisement message. In this case, however, since the care-of address in the RRQ message would match the home agent's own IP address, the home agent would responsively tear down the tunnel that it had with the foreign agent on the mobile node's last serving network. At that point, any communications destined to the mobile node's mobile-IP address will be routed conventionally to the mobile node's home agent, and the home agent (functioning as foreign agent) will forward those communications locally to the mobile node.

A great advantage of mobile-IP communications is that a mobile node can seamlessly move from serving network to serving network, and communications to the mobile node's mobile-IP address will in theory still make it to the mobile node notwithstanding that movement. In particular, each time the mobile node moves to a new serving network, the mobile node may simply re-register with the home agent, so that the home agent will in theory always have a record of the mobile node's current care-of address and thus where to send packet communications that are destined to the mobile node.

OVERVIEW

The present invention stems from a realization that problems can arise if errors exist in router advertisement messages.

In particular, a problem can arise with respect to billing a mobile node user for communication services if an incorrect care-of address is included in the router advertisement message that the mobile node receives. Specifically, if the router advertisement message for some reason incorrectly includes a care-of address that is the IP address of the mobile node's home agent, then the RRQ message that the mobile node responsively sends to its home agent will cause the home agent to inappropriately tear down the tunnel (if any) that exists between the home agent and the mobile node's actual care-of address. Once the tunnel is torn down, any communications that the home agent receives destined to the mobile-IP address of the mobile node will be dropped or at a minimum will not make it to the mobile node's foreign agent, since no tunnel would exist. However, the foreign agent will be unaware that the tunnel was torn down. Consequently, if applicable, the foreign agent might continue establishing billing records for outbound communications from the mobile node (from the mobile node's mobile-IP address), even though response communications destined to the mobile node's mobile-IP address will not make it to the mobile node.

This problem can be further understood by considering the two types of mobile-IP implementations discussed above. In the first implementation where a centralized home agent is provided and where each serving network has a separate foreign agent, the problem may arise if the mobile node's home agent receives an RRQ message that specifies as a care-of address an IP address that is the same as the home agent's IP address. In such an implementation, the care-of address should never be the IP address of the mobile node's home agent, since there should always be a foreign agent and a separate home agent serving the mobile node. When such an error occurs, as noted above, the tunnel between the home agent and foreign agent would be inappropriately torn down, which could result in the above discussed billing problem, among possibly other problems.

In the second implementation where the mobile node has a home network in which the mobile node's home agent functions as the mobile node's foreign agent as well, the problem may arise if a home agent that is not currently serving the mobile node as a foreign agent receives an RRQ message that specifies as care-of address an IP address that is the same as the home agent's IP address. In such an implementation, the care-of address should match the IP address of the mobile node's home agent only if the home agent is currently functioning as a foreign agent for the mobile node, that is, if the mobile node is operating on its home network.

The present invention provides a simple but important solution to help overcome this problem. According to the solution, when a mobile-IP home agent receives an RRQ message, the home agent will determine whether the RRQ message specifies as a care-of address an IP address that is the same as the home agent's IP address. If so, then, in a first embodiment, the home agent will simply drop or otherwise disregard RRQ message (i.e., without updating the mobile node's mobile-IP registration in response). This first embodiment will work well in the first implementation described above, where a centralized home agent is provided and where each serving network has a separate foreign agent, since, as noted above, such an RRQ is necessarily erroneous in such a scenario.

In the second implementation described above, namely, where the mobile node has a home network in which the mobile node's home agent functions as the mobile node's foreign agent as well, the home agent may further apply one or more conditions or tests before deciding to drop such an apparently improper RRQ message.

Preferably as one condition, the home agent will determine whether it is currently functioning as a foreign agent for the mobile node, in which case the RRQ message is likely legitimate and so the home agent should not drop it. To decide whether the home agent is currently functioning as a foreign agent for the mobile node, the home agent may determine whether the home agent currently has a serving communication link for the mobile node. If it determines that it currently has a serving communication link for the mobile node, then the home agent may conclude that the RRQ message properly designates as a care-of address an IP address that is the same as the home agent's IP address, since a reasonable assumption in that scenario is that the mobile node is now operating on its home network. On the other hand, if it determines that it does not have a serving communication link for the mobile node, then the home agent may conclude that the RRQ message improperly designates as a care-of address an IP address that is the same as the home agent's IP address, since a reasonable assumption in that scenario is that the mobile node is not operating on its home network. In the latter case, the home agent may thus properly drop the RRQ message.

In a cellular wireless communication system where the home agent is a PDSN, for instance, the PDSN may determine if it has a serving communication link for the mobile node by determining whether a Point to Point Protocol (PPP) data link exists between the PDSN and the mobile node and/or whether a Radio-Packet (R-P) link exists between the PDSN and a radio access network (e.g., base station controller and/or packet control function) serving the mobile node. The PDSN may determine this by simply referring to stored data that it maintains, indicating the presence of such links.

If the PDSN determines that such a PPP and/or R-P link exists, then the home agent may conclude that the RRQ message properly designates as a care-of address an IP address that is the same as the PDSN's IP address, since a reasonable assumption in that scenario is that the mobile node is operating on its home network. On the other hand, if the PDSN determines that such a PPP and/or R-P link does not exist, then the PDSN may conclude that the RRQ message improperly designates as a care-of address an IP address that is the same as the PDSN's IP address, since a reasonable assumption in that scenario is that the mobile node is not operating on its home network. Consequently, in that latter case, the PDSN may properly drop the RRQ message.

As another or further condition, the home agent may determine whether the home agent is currently functioning as a foreign agent receiving a handoff of the mobile node from another foreign agent and, if so, may conclude that the RRQ message properly designates as a care-of address an IP address that is the same as the home agent's IP address, since a reasonable assumption in that scenario is that the mobile node is operating (or is about to operate) in its home network. To determine whether the home agent is currently functioning as a foreign agent receiving a handoff of the mobile node from another foreign agent, the home agent may determine whether it has a foreign agent to foreign agent (FA-to-FA) tunnel with another foreign agent, which would be an indication that fast handoff of the mobile node is under way. (In fast handoff, such a tunnel may be established so as to allow the new foreign agent to immediately begin to serve the mobile node, by tunneling communications through the mobile node's old foreign agent until mobile-IPO re-registration is complete.)

For instance, in the cellular wireless communication system where the home agent is a PDSN, for instance, the PDSN may determine upon receipt of the RRQ request whether it has a PDSN-to-PDSN tunnel with another PDSN, for facilitating handoff of the mobile node. If the PDSN determines that it has a PDSN-to-PDSN tunnel for the mobile node, then the PDSN may conclude that the RRQ message properly designates as a care-of address an IP address that is the same as the PDSN's IP address, since a reasonable assumption in that scenario is that the mobile node is operating on its home network. On the other hand, if the PDSN determines that it does not have a PDSN-to-PDSN tunnel for the mobile node, then the PDSN may conclude that the RRQ message improperly designates as a care-of address an IP address that is the same as the PDSN's IP address, since a reasonable assumption in that scenario is that the mobile node is not operating on its home network. Thus, in the latter case, the PDSN may properly drop the RRQ message.

In a preferred arrangement, the home agent will first check to determine if it has a serving communication link for the mobile node. If so, the home agent will conclude that the RRQ message is proper. If not, however, the home agent will then check to determine if it has a foreign agent to foreign agent tunnel for the mobile node. If so, the home agent will conclude that the RRQ message is proper. But if not, the home agent will conclude that the RRQ message is improper and will drop it. In other embodiments, the home agent may apply further conditions or tests and/or different conditions or tests as well, in deciding whether to drop the RRQ message.

With the benefit of this solution, problems in billing of mobile node subscribers can be avoided or reduced. In particular, the process can reduce the likelihood that a home agent will improperly tear down its tunnel with a mobile node's foreign agent, and the process can thus reduce the likelihood that the mobile node user will end up being billed for outgoing packet communications for which the mobile node will not receive incoming response packet communications.

These as well as other aspects, advantages and alternatives will become apparent to those of ordinary skill in the art by reading the following detailed description, with reference where appropriate to the accompanying drawings.

DETAILED DESCRIPTION

Referring to the drawings, as noted above, FIGS. 1-4 are a simplified block diagrams of network arrangements in which an exemplary embodiment of the invention can be implemented. It should be understood, however, that these and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Figure 1:
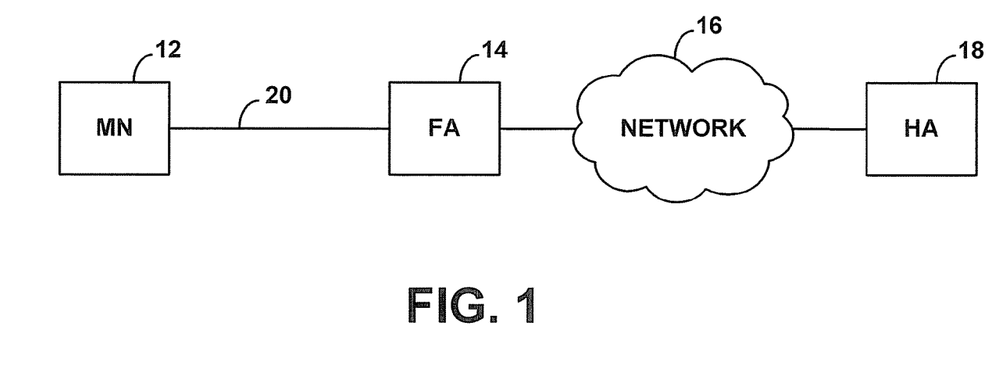
FIGS. 1-4 are simplified block diagrams of network arrangements in which an exemplary embodiment of the invention can be implemented.

As shown in FIG. 1, a basic network arrangement includes a mobile node 12, a foreign agent 14, a network 16, and a home agent 18. Foreign agent 14 serves mobile node 12 via a communication link 20, which may include wired, wireless, circuit-switched, packet-switched, networked and/or direct connection connections. Foreign agent 14 and home agent 16 then sit as nodes on network 18, each preferably having an IP address routable on network 16. Network 16 preferably comprises a packet-switched network, such as the Internet for instance.

In practice, foreign agent 14 may comprise an access point, a router, a network access server, a gateway, a proxy server and/or another entity that is operable to communicate with mobile node 12 and with entities on network 16 and that is programmed to function as a mobile-IP foreign agent in accordance with industry standards. Likewise, home agent 18 may comprise such a server or other entity programmed to function as a mobile-IP home agent in accordance with industry standards. Mobile node 12 may then comprise a client device or other entity programmed to function as a mobile-IP mobile node in accordance with industry standards.

In practice as discussed above, when mobile node 12 first powers on or otherwise establishes a connection with foreign agent 14, the mobile node may receive a router advertisement message from foreign agent 14, which would designate the care-of address of foreign agent 14. In response, the mobile node may then programmatically generate and send to the foreign agent 14 a mobile-IP RRQ message that specifies the foreign agent's care-of address and the mobile node's home address, if any. The foreign agent would then forward the RRQ message via network 16 to the home agent 18.

Upon receipt of the RRQ message, the home agent 18 would then tear down any existing foreign agent tunnel that the home agent has for the mobile node, the home agent would assign the a home-address for use by the mobile node if the mobile node does not yet have one, and the home agent would establish a record that correlates the mobile node's home-address with the foreign agent's care-of address. From that point forward, communications destined to the mobile node's home-address would be routed to the home agent 18, the home agent would route the communications via network 16 to the foreign agent 14, and the foreign agent would then route the communications locally via connection 20 to the mobile node 12.

Figure 2:
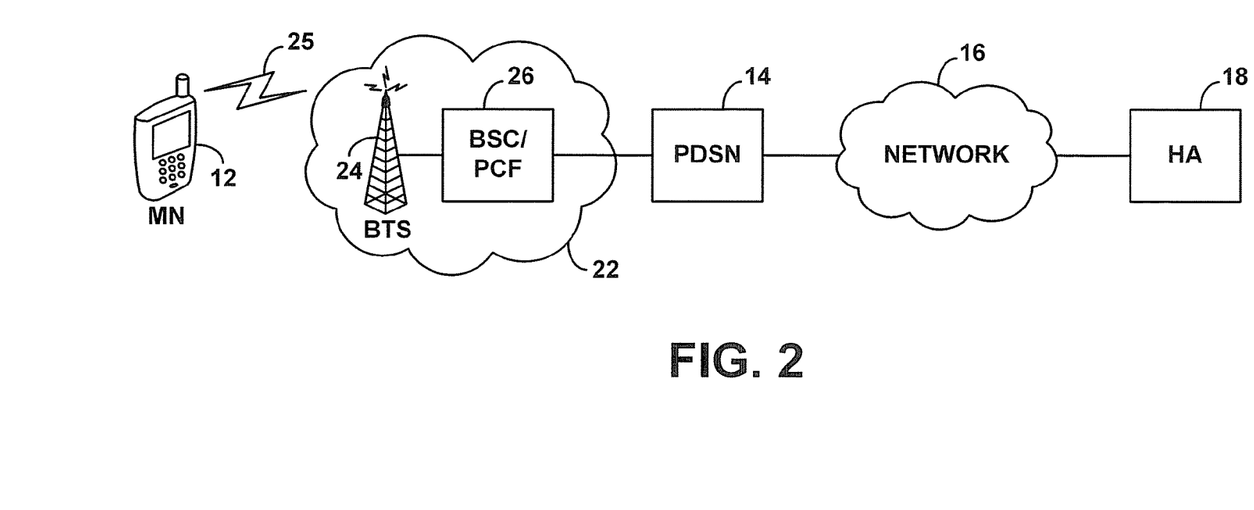

Without loss of generality, FIG. 2 next depicts a more specific version of the network arrangement shown in FIG. 1. In FIG. 2, the mobile node 12 is shown as a cellular wireless device such as a cell phone or wirelessly-equipped personal computer or personal digital assistant, and the communication link 20 is shown including a cellular radio access network (RAN) 22. The exemplary RAN includes a base transceiver station (BTS) 24, which radiates to define an RF air interface 25 between the RAN and mobile node 12. BTS 24 is then coupled with a base station controller (BSC)/packet control function (PCF) 26. Conventionally in this arrangement, foreign agent 14 is a PDSN, which functions as a network access server to provide packet-network connectivity for entities such as mobile node 12 that are served by RAN 22.

The arrangement of FIG. 2 works in the same way as the arrangement of FIG. 1, although the connection between the mobile node 12 and the foreign agent 14 (PDSN 14) comprises a cellular wireless data connection. In practice, the cellular wireless connection with mobile node 12 can take any of a variety of forms and may comply with any cellular wireless communication protocol now known or later developed, including for instance CDMA (e.g., 1xRTT, 1xEV-DO), TDMA, GSM, GPRS, or WiMAX.

In the cellular wireless arrangement, mobile node 12 may obtain a radio link layer connection with the RAN 22 and then a data link layer connection, such as a PPP session, with the PDSN 14, and the mobile node may then acquire or register a mobile-IP home address with home agent 18. Under the CDMA2000 protocol, for instance, the mobile node may send a packet-data origination request over air interface 25 to RAN 22. BSC/PCF 26 would then assign an air interface traffic channel defining a radio link layer connection for use by the mobile node. Further, BSC/PCF 26 would signal with PDSN 14, and PDSN 14 and mobile node 12 would then negotiate to establish a PPP session. In this process, a logical R-P link will be established for the mobile node, between the PDSN 14 and the BSC/PCF 26, to carry packet-data communications to and from the mobile node.

Upon establishment of the data link layer connection between the mobile node 12 and the PDSN 14, the mobile node may then receive a router advertisement message designating a care-of address of the PDSN, and the mobile node may responsively generate and send a mobile-IP RRQ that specifies the PDSN's care-of address and the mobile node's home address, if any. The PDSN would then forward the RRQ message via network 16 to the home agent 18, and the home agent would create or update a mobile-IP registration record for the mobile node in the same manner as discussed above. From that point forward, communications destined to the mobile node's home-address would then be routed to the home agent 18, the home agent would route the communications via network 16 to PDSN 14, the PDSN would then route the communications via the R-P link to the BSC/PCF 26, and the BSC/PCF 26 would transmit the communications via air interface 25 to the mobile node 12.

Figure 3:
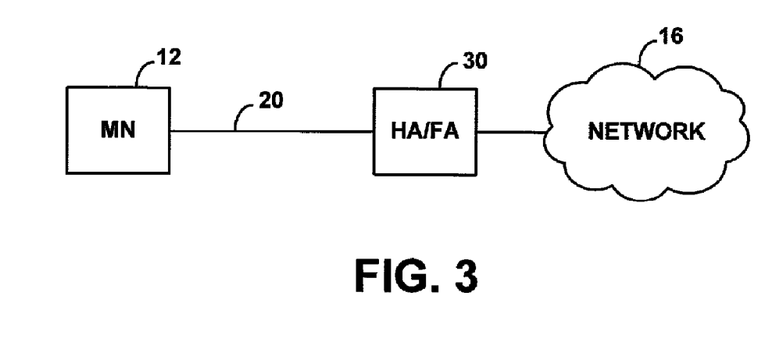
Figure 4:
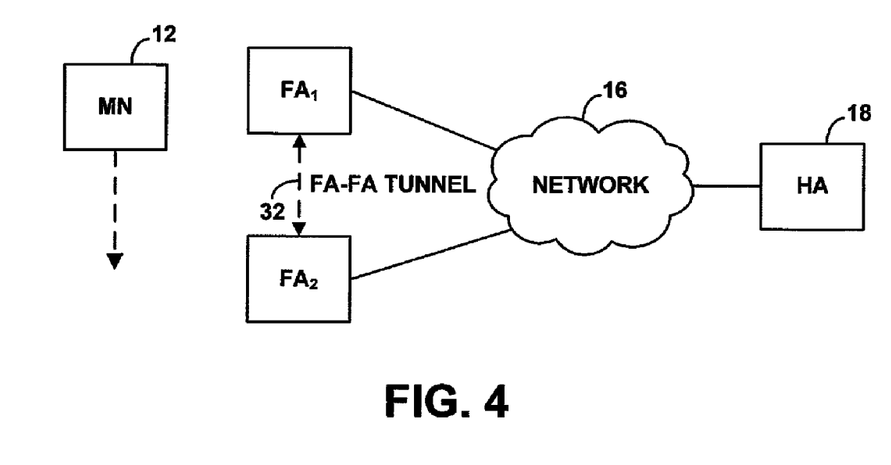

As described above, in some implementations, a mobile-IP home agent may itself serve as a mobile-IP foreign agent as well. FIG. 3 generally illustrates an example of this implementation. As shown in FIG. 3, the network arrangement includes mobile node 12, a combined home agent/foreign agent ("serving node") 30, and network 16. In this arrangement, the serving node 30 may operate as both a home agent and a foreign agent for mobile node 12. In particular, when the mobile node 12 establishes connectivity with the serving node 30, the mobile node 12 may receive an agent advertisement message from the serving node 30, designating the care-of address of the serving node 30. In response, the mobile node may then generate and transmit a mobile-IP RRQ message to the serving node 30.

In this arrangement, however, the serving node 30 is itself the mobile node's home agent as well. Therefore, when the serving node 30 receives the RRQ message from the mobile node 12, the serving node 30 will responsively tear down any tunnel that the serving node 30 (as home agent) had with another foreign agent for the mobile node, as the serving node will consider the mobile node to no longer be roaming in another foreign agent's network.

When a mobile node moves from one foreign agent's network to another, mobile-IP enables the mobile node to change its registration with its mobile-IP home agent, so that traffic destined to the mobile node's home address will reach the mobile node in the new serving network. In practice, however, this re-registration process can take some time to complete. During the re-registration process, it is thus possible that the home agent may send some communications to the mobile node's old foreign agent, when the mobile node has transitioned to be served instead by a new foreign agent.

To avoid data loss and to speed up the handoff process in this scenario, a temporary handoff tunnel can be established between the old foreign agent and the new foreign agent, so that the mobile node can more immediately be served by the new foreign agent. This arrangement is illustrated generally in FIG. 4. As shown, as the mobile node 12 moves from being served by a first foreign agent $FA_1$ to being served by a second foreign agent $FA_2$, the mobile node In particular, when the mobile node sends a mobile-IP RRQ message to a new foreign agent, the mobile node may identify its existing care-of address in the RRQ message. The new foreign agent may then not only send the RRQ along to the home agent but may also engage in signaling with the old foreign agent to establish a foreign agent to foreign agent fast handoff tunnel 32. Until the new foreign agent receives a mobile-IP RRP message back from the home agent, the new foreign agent may then transmit any communications from the mobile node via the fast handoff tunnel 32 to the old foreign agent for transmission onto network 16. Further, until the home agent 18 updates its registration record for the mobile node to show that the mobile node is served by the new foreign agent, the home agent would send to the old foreign agent any communications destined to the mobile node. The old foreign agent would then forward those communications via the fast handoff tunnel 32 to the new foreign agent, and the new foreign agent would forward the communications locally to the mobile node 12.

Figure 5:
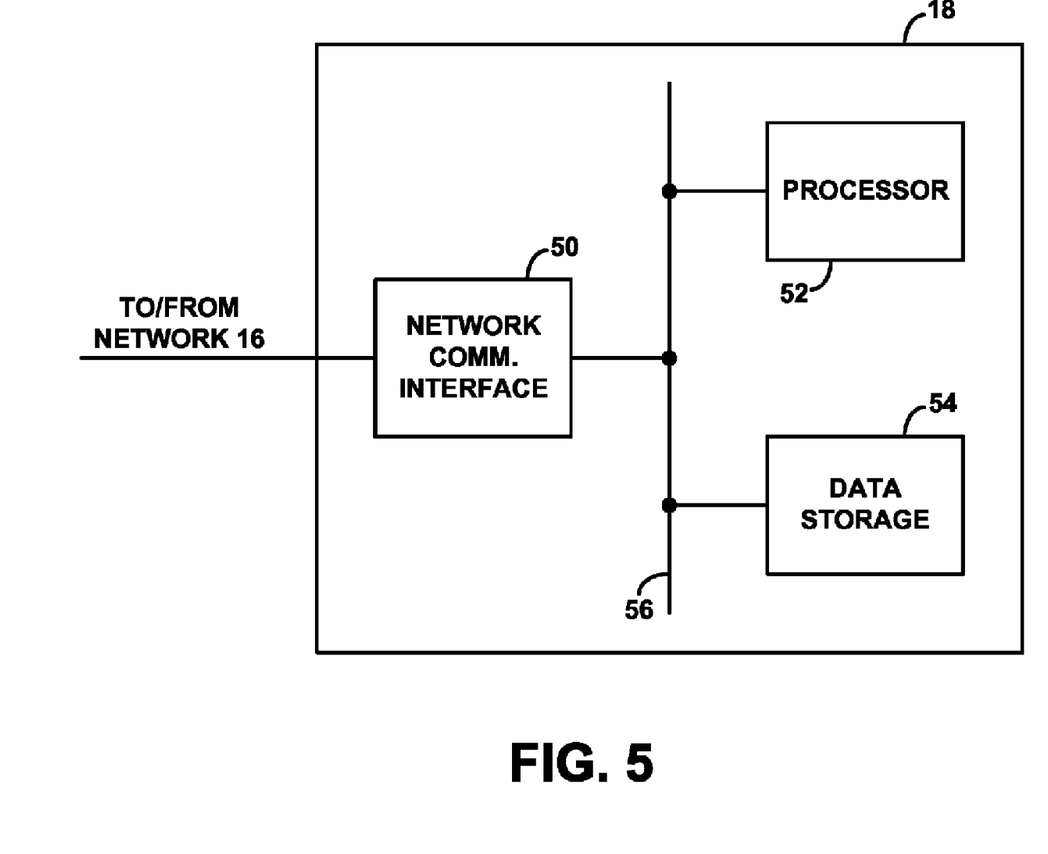
FIG. 5 is a simplified block diagram of a home agent at which the exemplary embodiment can be implemented.

FIG. 5 is next a simplified block diagram of a home agent 18 that can implement the exemplary embodiment. As shown in FIG. 5, the exemplary home agent 18 includes a network interface 50, a processor 52, and data storage 54, all of which may be coupled together by a system bus, network or other connection mechanism 56.

Network interface 50 functions to provide connectivity with network 16 and may take the form of an Ethernet network interface card or some other sort of port, providing wired or wireless connectivity. Through network interface 50, home agent 18 may send and receive packet-data communications, including mobile-IP signaling messages, such as RRQ and RRP messages for instance.

Processor 52 comprises one or more general purpose processors (e.g., INTEL microprocessors) and/or special purpose processors (e.g., digital signal processing chips). And data storage 54 comprise one or more volatile and/or non-volatile storage components, such as magnetic, optical, or organic storage, which may be integrated in whole or in part/with processor 52.

Data storage 54 preferably contains program instructions executable by processor 52 to carry out various functions described herein, as well as reference data such as mobile-IP registration records and, in the event home agent 18 can also function as a foreign agent, records indicating the presence of serving connections such as data links, R-P links, or the like.

Preferably, the program instructions define basic mobile-IP functionality and further define functions of the present invention. For example, the program instructions may define logic executable upon receipt of an RRQ message to determine whether the RRQ message designates a care-of address that is the same as an IP address of the home agent and (i) if not, then to process the RRQ as normal (including creating or updating a mobile-IP registration record for the requesting mobile node), but (ii) if so, then to drop the RRQ message. As another example, the program instructions may define logic executable to condition dropping of an RRQ message on a determination that the home agent is currently functioning as a foreign agent for the mobile node, such as by determining that the home agent has a serving communication link (e.g., R-P and/or data link) for the mobile node or that the home agent has a fast handoff tunnel for the mobile node.

Figure 6:
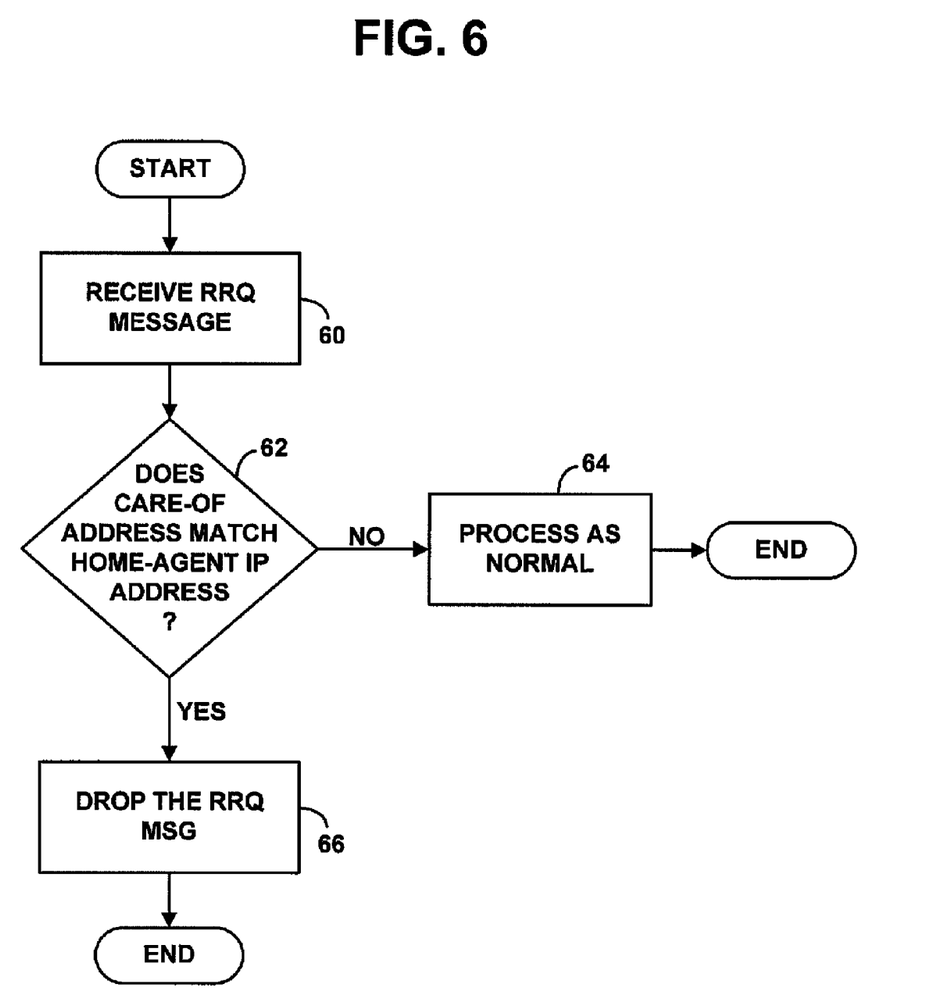
FIGS. 6-7 are a flow chart depicting functions that can be carried out in accordance with the exemplary embodiment.

FIG. 6 is next a flow chart depicting functions that can be carried out in accordance with the exemplary embodiment, to process mobile-IP messages in an improved manner. Preferably, these functions would be carried out by a mobile-IP home agent, such as home agent 18 for instance. However, some or all of the functions could just as well be carried out by another entity, such as an intermediary in the communication path leading to the home agent, so as to handle mobile-IP registration requests sent to (e.g., addressed to, being sent to, or just arrived at) the home agent.

As shown in FIG. 6, at step 60, the process begins by receiving a mobile-IP RRQ message. At step 62, the process then involves determining whether the RRQ message designates a care-of address that is the same as an IP address of the home agent. At step 64, if the determination is that the RRQ message designates a care-of address that is not the same as the IP address of the home agent, then normal mobile-IP registration occurs. For instance, the home agent may create or update a mobile-IP registration record for the requesting mobile node, correlating a home address of the mobile node with the designated care-of address, and the home agent may send a mobile-IP RRP message, possibly designating the home address. On the other hand, if the determination at step 62 is that the RRQ message designates a care-of address that is the same as the IP address of the home agent, then the process involves dropping the RRQ message, such as by not sending a response to the RRQ message and/or not responsively updating or creating a mobile-IP registration record for the mobile node.

As explained above, this process can help to avoid wrongly tearing down a tunnel with a foreign agent in a system where the mobile node is normally served by a foreign agent separate from its home agent (e.g., in a system providing a centralized home agent and in which each serving network has a separate foreign agent). In such a scenario, an RRQ that designates a care-of address matching the home agent's IP address would likely be erroneous. Thus, the invention would help avoid problems by having the home agent drop such an RRQ message.

Figure 7:
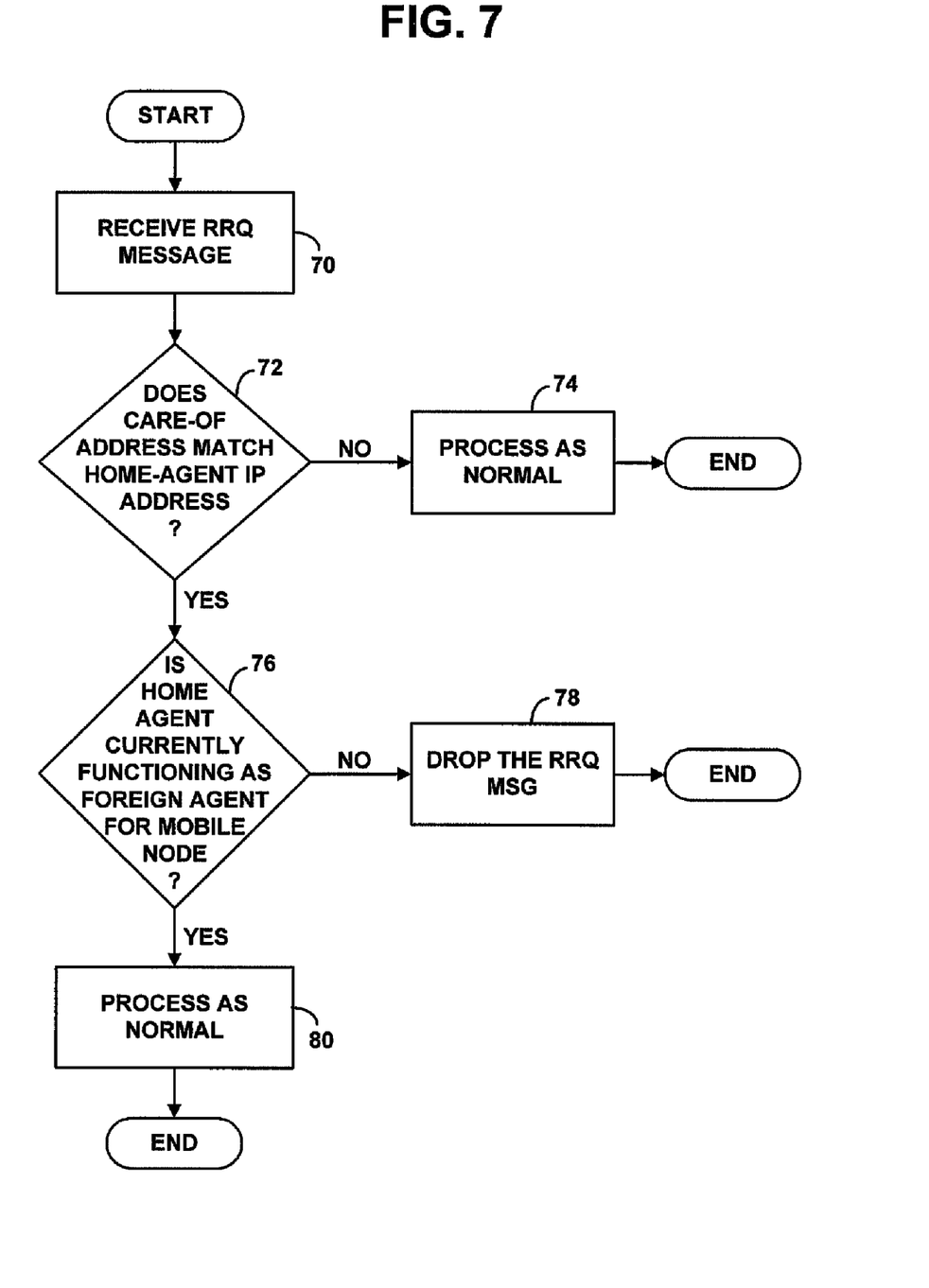

As further explained above, however, in other systems, a home agent could function as a foreign agent as well. To account for that possibility, the exemplary method may further involve conditioning the dropping of an RRQ message on verification that the home agent is not currently functioning as a foreign agent for the mobile node. FIG. 7 is a flow chart depicting steps that can be involved in this expanded process.

Steps 70-74 in FIG. 7 are the same as steps 60-64 of FIG. 6. In particular, the process involves receiving a mobile-IP RRQ, determining whether the care-of address designated by the RRQ matches an IP address of the home agent, and, if not, processing the RRQ as normal. In FIG. 7, however, if the determination at step 72 is that the care-of address does match the IP address of the home agent, then the process continues at step 76 with a determination of whether the home agent is currently functioning as a foreign agent for the mobile node.

As noted above, the act of determining whether a home agent is currently functioning as a foreign agent for a mobile node may involve determining whether the home agent currently has a serving communication link for the mobile node. For instance, if the home agent is a PDSN, the act could involve determining whether the PDSN currently has an R-P link established for the mobile node, by simply referencing stored data if any that would indicate the existence of such links. If the PDSN has an R-P link for the mobile node, that means the PDSN is functioning as a foreign agent for the mobile node, or at least it justifies the fact that the care-of address in the RRQ message matches the home agent's IP address.

As another example, the act of determining whether the home agent currently has a serving communication link for the mobile node may involve determining whether the home agent currently has a data link layer connection (e.g., PPP session) with the mobile node, also by referencing stored data if any that would indicate the existence of such links. If the home agent has a data link layer connection with the mobile node, that means the foreign agent is functioning as a foreign agent for the mobile node, or at least it justifies the fact that the care-of address in the RRQ matches the home agent's IP address.

And as still another example, the act of determining whether the home agent currently has a serving communication link for the mobile node may involve determining whether the home agent has a foreign agent to foreign agent tunnel for the mobile node. For instance, if the home agent is a PDSN, the act may involve determining if the home agent has a PDSN-to-PDSN tunnel with another PDSN. The existence of such a tunnel would indicate that the home agent is currently functioning as a foreign agent (either an old one or a new one) for the mobile node, or would at least justify the fact that the care-of address in the RRQ matches the home agent's IP address.

If the determination at step 76 is that the home agent is not currently functioning as a foreign agent for the mobile node, then, at step 78, the process involves dropping the RRQ message, again by not responding with an RRP and/or by not creating or updating a mobile-IP registration record in response. On the other hand, if the determination at step 76 is that the home agent is currently functioning as a foreign agent for the mobile node, then, at step 80, the process proceeds as normal. For instance, the home agent may tear down a tunnel, if any, that the home agent had in place with another foreign agent for the mobile node.

An exemplary embodiment of the present invention has been described above. Those skilled in the art will appreciate that many changes from the foregoing description are possibly while remaining with the scope of invention as claimed.

We claim:

1. A mobile-IP home agent comprising:
   a network communication interface for connecting with a packet-switched network, and for receiving and sending packet-data including mobile-IP signaling messages;
   a processor;
   data storage;
   program instructions stored in the data storage and executable by the processor, upon receipt via the network communication interface of a mobile-IP registration request (RRQ) message for a mobile node, (i) to make a determination whether the RRQ message designates a care-of address that is the same as an IP address of the home agent, (ii) if the determination is that the RRQ message does not designate a care-of address that is the same as the IP address of the home agent, then to process the RRQ message including updating a mobile-IP registration record for the mobile node, and (iii) if the determination is that the RRQ message designates a care-of address that is the same as the IP address of the home agent, then to drop the RRQ message, wherein the data storage further includes data indicating whether the home agent is currently functioning as a mobile-IP foreign agent for the mobile node, and wherein, if the determination is that the RRQ message designates a care-of address that is the same as the IP address of the home agent, the program instructions are further executable to condition dropping of the RRQ message on a further determination, based on the data, that the home agent is currently functioning as a mobile-IP foreign agent for the mobile node.

2. The mobile-IP home agent of claim 1, wherein the data storage indicates whether the home agent is currently functioning as a mobile-IP foreign agent for the mobile node by indicating whether the home agent has a serving communication link for the mobile node.

3. A mobile-IP home agent comprising:

a network communication interface for connecting with a packet-switched network, and for receiving and sending packet-data including mobile-IP signaling messages;

a processor;

data storage;

program instructions stored in the data storage and executable by the processor, upon receipt via the network communication interface of a mobile-IP registration request (RRQ) message for a mobile node, (i) to make a determination whether the RRQ message designates a care-of address that is the same as an IP address of the home agent, (ii) if the determination is that the RRQ message does not designate a care-of address that is the same as the IP address of the home agent, then to process the RRQ message including updating a mobile-IP registration record for the mobile node, and (iii) if the determination is that the RRQ message designates a care-of address that is the same as the IP address of the home agent, then to drop the RRQ message, wherein the data storage further includes data indicating whether the home agent has a foreign agent to foreign agent (FA-to-FA) tunnel for the mobile node, and wherein, if the determination is that the RRQ message designates a care-of address that is the same as the IP address of the home agent, the program instructions are further executable to condition dropping of the RRQ message on a further determination, based on the data, that the home agent has an FA-to-FA tunnel for the mobile node.

\* \* \* \* \*